July 18, 1961     M. F. PETERS     2,992,634
HIGH PRESSURE HIGH TEMPERATURE ACTUATORS
Filed May 1, 1959     3 Sheets-Sheet 1

INVENTOR.
Melville F. Peters
BY
ATTORNEY

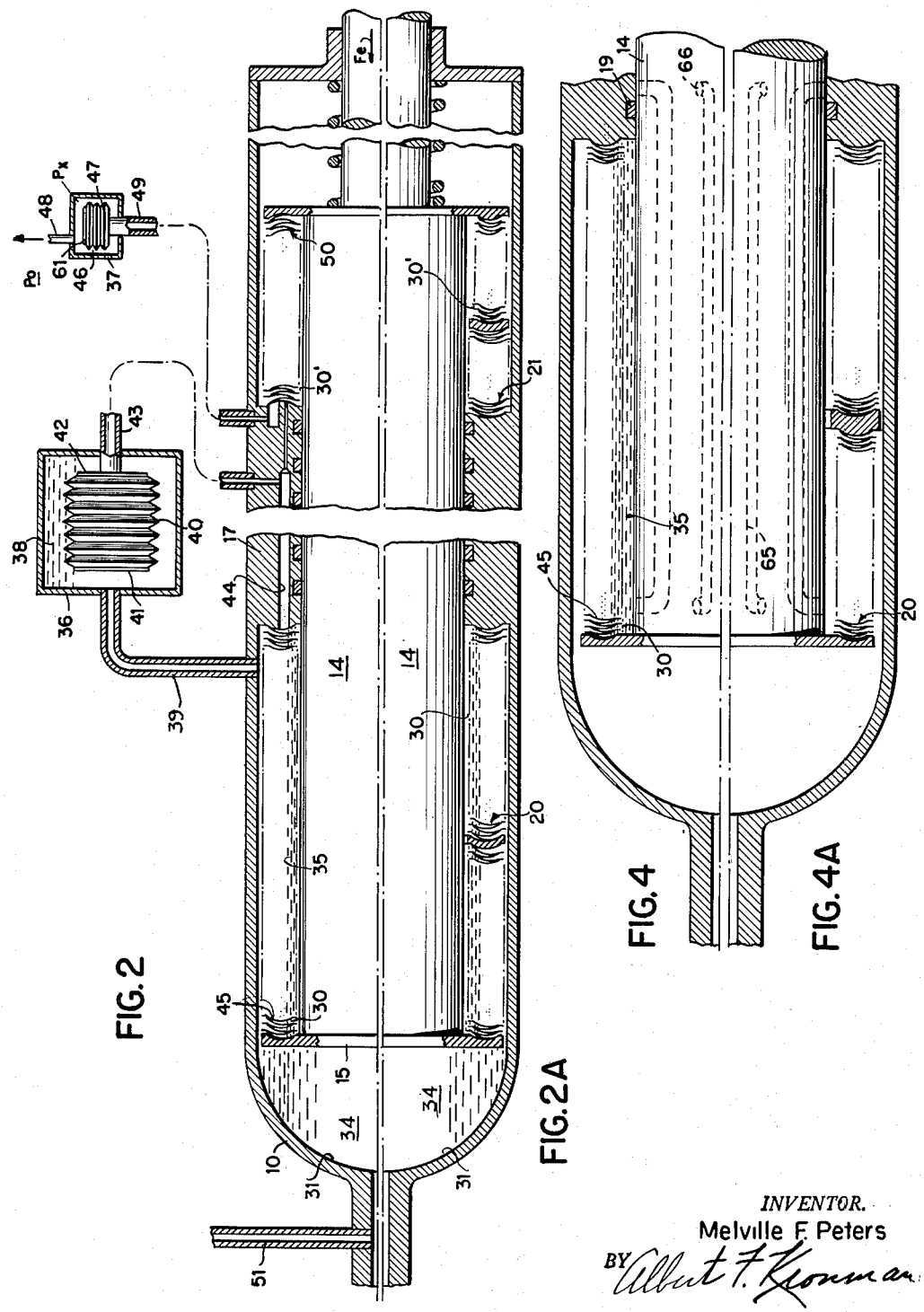

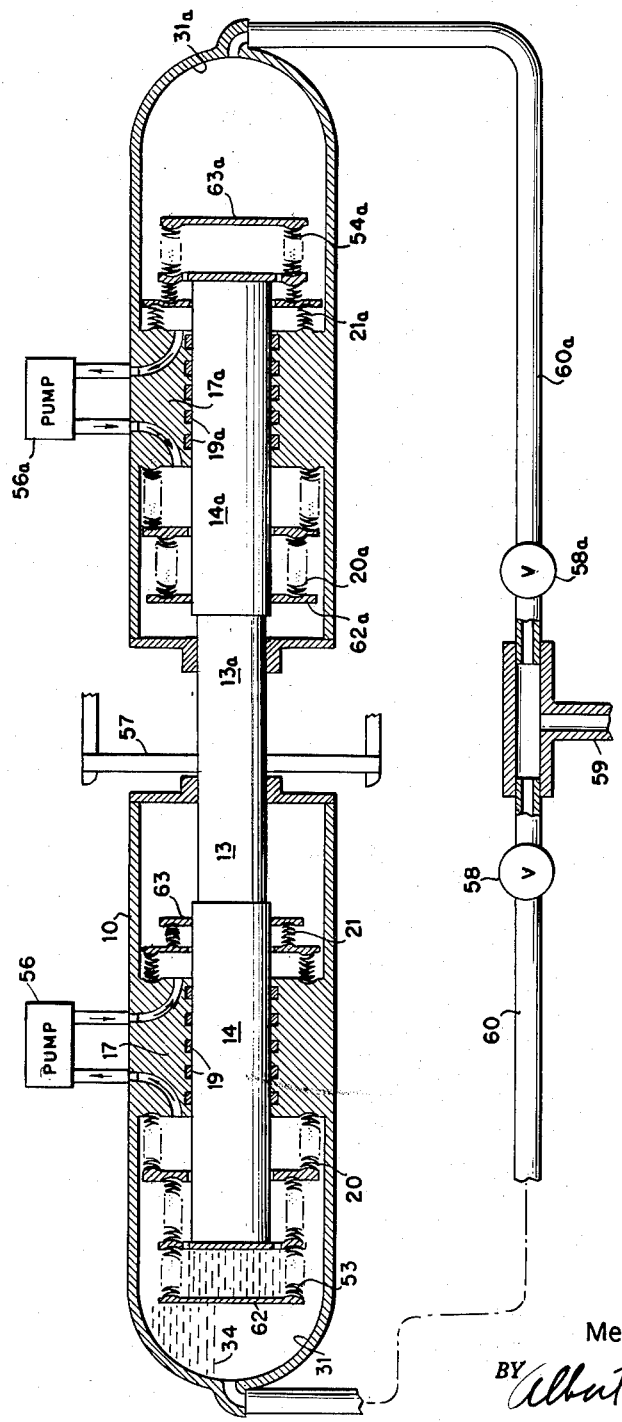

United States Patent Office 2,992,634
Patented July 18, 1961

2,992,634
HIGH PRESSURE HIGH TEMPERATURE ACTUATORS
Melville F. Peters, Livingston, N.J., assignor of fifty percent to Joseph J. Mascuch, Millburn, N.J.
Filed May 1, 1959, Ser. No. 810,513
18 Claims. (Cl. 121—48)

This invention relates to actuators and particularly to actuators capable of delivering large amounts of energy and operating at extremely high temperatures.

Where it is desired to exert a substantial force over some predetermined distance in the presence of ambient temperatures in excess of 1500° F., presently known actuators employing gears and worms are unsatisfactory. The use of known pistons and fluids in actuators is also impractical where extremely high temperatures are encountered and where weight, and space limitations are involved.

In some installations the operating fluids may have toxic properties making it necessary to confine the fluids within the system under all circumstances.

Accordingly, it is an object of the present invention to provide an actuator employing metal bellows in its flexible assembly which can exert large amounts of force and remain operative at temperatures in excess of 1500° F.

Another object of the present invention is to provide an actuator which can exert a large force while occupying a relatively small enclosure.

A further object of the present invention is to provide an actuator which will continue to function over a wide range of temperatures and even where the temperature throughout the actuator may vary substantially.

Still another object of the present invention is to provide an actuator employing hydraulic principles wherein the operating fluid may be selected from toxic as well as non-toxic materials, without sacrificing safety requirements.

An object of the present invention is to produce by means of an actuator, a thrust of several hundred thousand pounds or more while restricting the pressure differential across the flexible bellows assemblies to a very small fractional part of the operating pressure.

A feature of the present invention is its use of nesting type metal bellows in the flexible assembly of the actuator.

Another feature of the present invention is its use of opposed metal bellows within the actuator whereby fluid may pass from one bellows to the other as the actuator is operated.

A further feature of the present invention is its use of bellows assemblies having two or more unequal diameters.

A feature of the present invention is its use of expansion chambers and pumps connected across the bellows to prevent excessive pressure differentials from destroying the bellows.

The invention consists of the construction, combination and arrangement of parts, as herein illustrated, described and claimed.

In the accompanying drawings, forming a part hereof are illustrated several forms of embodiments of the invention and in which:

FIGURE 2 is a fragmentary view in longitudinal cross-section of a second embodiment of an actuator according to the present invention.

FIGURE 2A is a view similar to FIGURE 2 showing the use of two diameter bellows assemblies in the actuator.

FIGURE 4 is a fragmentary view in longitudinal section with certain internal features shown in dashed lines, a further embodiment of the present invention.

FIGURE 4A is a view similar to FIGURE 4 showing the use of two diameter bellows.

FIGURE 5 is a view in longitudinal section of a control assembly employing two actuators made in accordance with the present invention.

Figure 1:
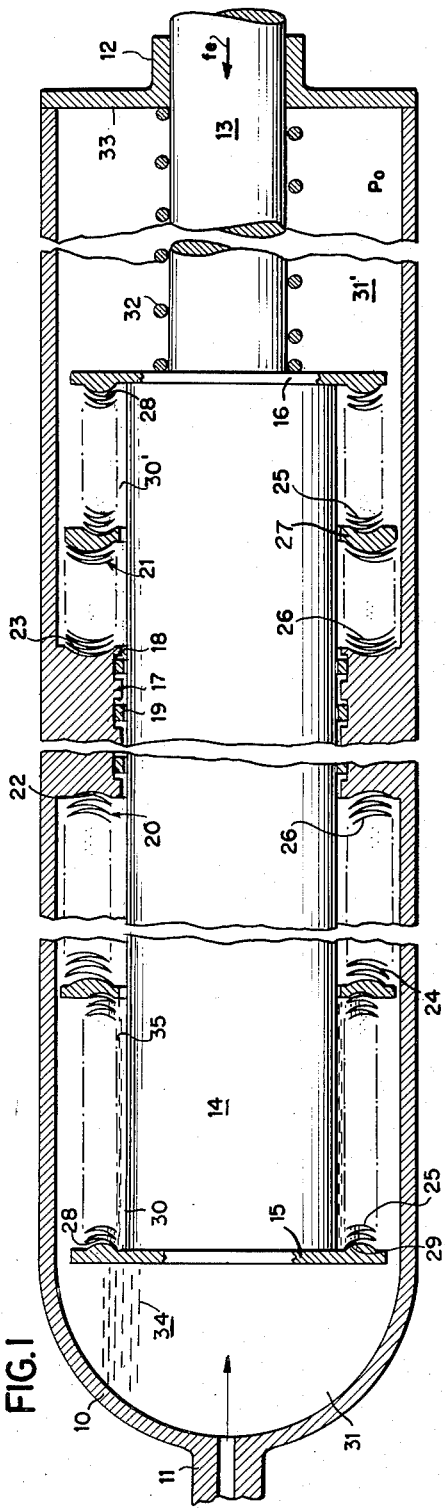
FIGURE 1 is a view in longitudinal section with certain elements shown in elevation of an actuator according to the present invention.

Referring to the drawings and particularly to FIGURE 1, 10 indicates an elongated hollow housing having an inlet port 11 at one end thereof and a neck 12 at its opposite end. An actuator rod 13 is slidably received within the neck 12.

A piston 14 having a plate 15, 16, secured at each end thereof, is carried within the housing 10. The plate 16 in turn has the inner end of the rod 13 fastened thereto. Within the housing 10 there is also located a wall 17, having a central opening 18 therein. A plurality of rings 19 are carried by the wall 17 within the opening 18 and fit loosely around the piston 14.

Bellows assemblies 20, 21, are welded to each side of the wall 17 within the housing 10. The wall 17 is provided with bellows receiving seats 22, 23, upon which the bellows assemblies 20, 21 are secured. The bellows assemblies 20, 21 are preferably of the nesting type, that is, the washer-like discs 24 of which the bellows are made are of a configuration which, when compressed or collapsed completely, will bear against each other to form a rigid tubular structure capable of withstanding extremely high pressures. Bellows assembly 21 is somewhat larger in volume than bellows assembly 20 to prevent failure due to excessive pressure differentials across the bellows 21 during the operation of the actuator.

It will also be seen from an examination of FIGURE 1, that the bellows assemblies 20, 21 are made up of two bellows 25, 26, welded to a ring 27 therebetween. The bellows 25 is of a smaller diameter than bellows 26. This construction is hereinafter referred to as a two diameter bellows assembly. The use of two diameter bellows assemblies within the actuator provides a structure whereby increases or decreases of volume within the bellows may be effected without changing the overall length of the bellows. The importance of this feature will hereinafter be more fully explained.

The outer ends 28 of the bellows assemblies 20, 21 are welded to the plates 15, 16, as indicated at 29, to divide the housing 10 into inner and outer chambers 30, 31.

A coil spring 32 completes the construction of the actuator shown in FIGURE 1. The coil spring 32 is disposed around the rod 13 and bears against the end wall 33 of the housing 10 at one end and the plate 16 on the piston 14 at its opposite end. The spring 32 urges the actuator into its retracted position when pressure is removed from the piston 14.

The inner and outer chambers 30, 31 within the housing 10 are filled with a suitable working substance 35, 34, depending upon the conditions under which the actuator is to be operated. Such substances may consist of helium gas, oil, water and metal in a fluid state, or the like.

The actuator shown in FIGURE 1 is operated by introducing a fluid or working substance 34 such as helium gas under pressure or a liquid into chamber 31 through the inlet port 11 until the pressure acting on plate 15 produces a force great enough to overcome the exterior force $F_e$ and all the internal forces such as those created by the spring 32, the spring-like action of the bellows assemblies 20, 21 and the fluid 34.

The piston 14 will then be forced out of the chamber 31 into which the fluid 34 is introduced thereby driving a portion of the rod 13 out of the chamber 31'.

In order to illustrate the nature of the forces involved, let the fluid pressure in chamber 31 be increased from practically zero to 5000 p.s.i. in one second, so that the rate of pressure change in the chamber is 5000 p.s.i./second. If the fluid 34 enters the chamber at 80° F. and is immediately heated therein to 1500° F., which is the operating temperature of the actuator, a pressure wave will be developed in the system which may cause the instantaneous pressure in the chamber to exceed 5000 p.s.i. Assume that all these pressure fluctuations have taken place and at the end of one second the pressure in chamber 31 is stabilized at 5000 p.s.i. so that to complete the cycle in four seconds, which is assumed to be a severe operating condition, it will require the piston to complete the stroke in 3 seconds, where it is assumed the stroke is 6 inches. If the effective area of the bellows assembly 20 is 24 square inches, then the force exerted on the end of plate 15 and transmitted to piston 14 will be 120,000 pounds, which has the capacity to produce (120,000×6 inches)=60,000 foot-pounds of work, and if this is accomplished in three seconds, there will be an expenditure of $$\left(\frac{60,000}{550 \times 3}\right) = 36.4 \text{ H.P.}$$

Since the actuator may be operated under a wide variety of conditions, assume that during the first second the helium or other fluid pressure in chamber 31 will be increased from 0 to 5000 p.s.i. at a uniform rate, and that the piston is held in place by a force $F_e$ of 120,000 pounds, so that the piston 14 cannot move until the end of the first second.

During this period:

(1) The force acting on piston 14 through end plate 15 will increase from practically nothing to 120,000 pounds.

(2) The pressure acting on the outer surface of the bellows assembly 20 will increase from practically nothing to 5000 p.s.i.

(3) Since the two diameter bellows assembly changes in volume without a change in overall length, when the assembly is subjected to a change in the differential pressure, the bellows assembly 20 will decrease in volume with an increase in pressure of liquid 34 until the pressure of the liquid 35 in the inner chamber 30 is approximately 5000=50 p.s.i. (where a change in the pressure differential of 50 p.s.i. represents the difference which must be established between the pressure in chambers 31 and 30 to cause bellows assembly 20 to experience a maximum decrease or increase in volume). Since the internal pressure acting on the inner surface of bellows assembly 20 is always equal to the external pressure acting on bellows assembly 20, as long as sufficient fluid is contained in chamber 30 to act as a supporting surface for bellows 25, 26, the pressure differential across bellows assembly 20, will never exceed 50 p.s.i.

(4) As soon as the pressure in chamber 30 exceeds the trivial pressure in chamber 31' of bellows assembly 21, liquid or other contained fluid will be forced from chamber 30 to chamber 30' through the small openings between piston 14 and the loosely fitting rings 19. As fast as the liquid 35 passes from chamber 30 to chamber 30', the bellows assembly 20 decreases in volume by an amount which is equal to the volume of liquid which has been forced out of chamber 30 into chamber 30', if the presure dfferential is not to exceed 50 p.s.i. as described under (3). Since the force $F_e$ acting on piston 14 through rod 13 is equal to or greater than the force produced by the fluid 34 acting on plate 15 during the first second, the decrease in volume in chamber 30 must be obtained by the elongation of small bellows 25 and the compression of large bellows 26 because piston 14 will not move toward chamber 31'.

It will be apparent that if the volume of chamber 30 has been reduced to as small a value as possible by compressing large bellows 26 and expanding small bellows 25 with the piston 14 fixed in its extended position as shown in FIGURE 1, that the pressure differential between chambers 30 and 31 would approach 5000 p.s.i., if the volume of fluid 35 passing through the rings 19 into chamber 30', were greater than the decrease in volume of bellows assembly 20. To prevent the development of this large pressure differential across bellows assembly 20, it is necessary to make the clearances between the wall opening 18 and rings, 19, small enough to assure that the volume of liquid 35 escaping from chamber 30 to chamber 30' is less than the change in volume which bellows assembly 20 can make by compressing bellows 26 and expanding bellows 25 during this first second.

The events which take place during the three seconds the piston 14 is moving from its initial to its final position follow:

(1) Liquid 35 is forced from chamber 30 to chamber 30'. Within reasonable limits the pressure differential across the bellows can be maintained at 50 p.s.i. by the bellows assembly 20 increasing or decreasing in volume to accommodate the pressure differentials which are determined by many factors, three of which are the size of the openings between piston 14 and rings 19, the viscosity of liquid 35 and the rate at which piston 14 travels throughout its six inch stroke.

(2) The liquid 35 serves as a lubricant as it flows between the piston 14 and the relatively loosely fitting rings 19. Galling can be greatly reduced if the mating surfaces of these rings and the piston 14 are covered by a material which is wet by the liquid.

(3) Since the bellows assembly 21 is substantially the same as the bellows assembly 20, the increase in volume of bellows assembly 21 with a movement of piston 14 will be approximately the same as the decrease in volume of the bellows assembly 20. The small differences which arise between the change in volume of chamber 30 and the change in volume of chamber 30' with a displacement of piston 14, are corrected by the relative movement of the bellows assemblies 20, 21, which movements must take place when the assemblies are subjected to small changes in differential pressure. These small changes in the differential pressure in the bellows assembly 21, are caused by the volume of liquid discharged by bellows assembly 20 being slightly different than the change in volume of the bellows assembly 21 during the working cycle of piston 14.

(4) Piston 14 is brought to rest by the nesting of bellows assembly 20. These nested bellows will support plate 15 and piston 14 as long as the fluid pressure is maintained in chamber 31. Since there is no further axial displacement of piston 14 there can be no passage of liquid 35 between the rings 19 and piston 14, except the liquid which must pass to compensate for changes in temperature. These necessary changes in volume which must take place in the two bellows assemblies 20, 21 to compensate for changes in temperature are relatively small compared to the large change in volume which must take place when piston 14 is executing the power stroke. These changes in volume are made by the relative movements of the two pairs of bellows 25, 26 in the two diameter bellows assemblies.

When the pressure in chamber 31 is reduced to $P_0$ which is the pressure in the rod chamber 31', the spring 32 will force piston 14 back to its initial position of rest. The return stroke of piston 14 is relatively slow compared with the time required for the piston to execute the power stroke, since the forces of resitution exerted by the spring 32 on the piston 14 during the return stroke, are relatively small compared to the forces exerted by the pressurized fluid 34 on the piston 14 during the forward or power stroke. It is also necessary that all the liquid delivered to chamber 30' by chamber 30 during the power stroke, be returned to chamber 30 during the return stroke.

When piston 14 has returned to its initial position the actuator will have completed one cycle, and will be set for the next cycle which is started by admitting the pressurized fluid 34 into chamber 31.

Under certain operating conditions, the bellows assembly 20 of the actuator shown in FIGURE 1, may be destroyed. This, for example, should the passageways between the chambers 30 and 30', become blocked so that the fluid 35 can not pass from chamber 30 to 30' and the exterior force, $F_e$, resisting the movement of the piston 14 be reduced to zero, the pressure developed by the piston movement will be transferred to the walls of the bellows assembly 20. As the piston 14 continues to compress the fluid 35 with a driving force of 120,000 lbs., a pressure differential of many thousands of pounds can be created between inner and outer chambers 30, 31, which will expand the bellows 25, 26, until they either burst or become supported by the inner wall of the housing 10.

A second set of conditions which will destroy the bellows 20 in the actuator hereinabove described can occur when the fluid pressure applied to the piston 14 is high but not great enough to move the said piston. Such condition may result where the actuator must lift a 120,000 pound weight, and the pressure of fluid 34 in chamber 31 is limited to the order of 3000 or 4000 p.s.i. Under these conditions the high pressure acting on bellows assembly 20 will cause liquid 35 to flow from chamber 30 to chamber 30'. This flow of liquid will force the bellows assembly 20 to decrease in volume by the same amount and at the same time rate as the volume changes which take place in the liquid leaving chamber 30 and entering chamber 30'. Chamber 30 is decreased in volume by compressing the large bellows 26. After bellows 26 has nested, no further decrease in volume of the bellows assembly can take place by increasing the pressure differential across the bellows assembly 20.

It follows from this that if the high pressure is not removed from the bellows assembly at the instant large bellows 26 is nested while bellows 25 is extended, a passage of a few drops of liquid from chamber 30 to chamber 30', will create a pressure differential across bellows assembly 20, equal to the pressure of the fluid 34 in the chamber 31. This pessure differential which may reach 4000 p.s.i. will be great enough to distort or destroy the bellows assembly 20.

The most severe conditions which may arise for the operation of the actuator have been described. The conditions are severe because the piston is held fixed for a period of time, which means the flow of liquid through opening 18 and past rings 19 must be slow if the differential pressure across bellows assembly 20 is to remain small by maintaining sufficient liquid in chamber 30 to act as a supporting surface for the assembly. In addition, the bellows assembly is undergoing the relatively small change in volume which results from the change in length of bellows 25, 26, when subjected to a change in pressure differential. At the end of one second the fluid flows from chamber 30 to 30' at a sufficient rate to allow piston 14 to travel the six inches in 3 seconds, without allowing the pressure in chamber 30 to exceed 5000±50 p.s.i.

While the above described actuator can be used under less severe conditions with safety, it is within the purview of the present invention to modify the unit so that it can work under all conditions. Such an actuator is shown in the embodiments illustrated in FIGURES 2 and 2A which are capable of operating with the same efficiency as the actuator of FIGURE 1, but are not subject to destruction due to the forces hereinabove discussed. The modifications of FIGURES 2 and 2A are substantially similar in construction and operation to the actuator of FIGURE 1 with the addition thereto of expansion units 36, 37.

Expansion unit 36 consists of a fluid tight chamber 38 having a fluid bearing line 39 connected thereto. The opposite end of line 39 is led through the housing 10 and communicates with the fluid 34 in chamber 31. A nesting type bellows 40 is placed within the chamber 38 and is closed at one end by a disc 41. The opposite end of the bellows 40 is covered by a washer 42 within which there is secured a fluid bearing line 43. The line 43 is led from the bellows 40 to bore 44 in the housing wall 17, as shown by the dashed lines which connect the line 43 with the inner chamber 30 of the bellows assembly 45.

The expansion unit 37 consists of a chamber 46 within which there is carried a bellows 47. The chamber 46 is provided with an outlet 48 whereby the interior of the chamber 46 can be maintained at pressure $P_x$. A line 49 is connected from the bellows 45 to the interior of bellows 50 which is secured on the rod side of the wall 17 within the housing 10. The free end of bellows 46 is sealed by a plate 61.

A conduit 51 is connected to the inlet port 11 so that the chamber 31 in the housing 10 can be evacuated. The operation of the conduit 51 will hereinafter be more fully set forth.

When the rate at which the working substance 34 is admitted to the chamber 31 in FIGURE 2 is slow, and fairly constant enough to eliminate the possibility of developing transient pressures in the system the single diameter bellows 45, 50, may be used. However, where rapid and variable pressures are anticipated, the two diameter bellows assemblies 20 and 21, shown in FIGURE 2A should be employed. In either construction, however, the bellows are preferably of the nesting type.

The actuators illustrated in FIGURES 2 and 2A are prepared for operation by filling chambers 30, 30', lines 39, 43, bore 44, line 49 and bellows 40 and 47, with a fluid 35, while the two bellows 40, 47, are held in a partly compressed position. The bellows must be held in the partly compressed position during the filling operation, so that they will be free to expand and increase the volume of the two inclosures 30, 30', when the actuator experiences an increase in temperature, or when the bellows assemblies 45, 50, or 20, 21, are compressed by a movement of piston 14. To simplify the description, it will be assumed again that the forces introduced by the spring action of the bellows are negligible compared to the forces developed by the working substance 34 introduced through the inlet port 11.

The piston 14 in the actuator begins its working stroke as soon as the operating fluid 34 enters the chamber 31 and reaches its critical pressure. By critical pressure is meant the lowest pressure required to move the piston 14 while overcoming the exterior force $F_e$. A portion of the fluid 34 entering the chamber 31, will flow through the line 39, until the pressure in the chamber 38 is equal to the pressure in the chamber 31. The bellows assemblies 45 in FIGURE 2, or 20 in FIGURE 2A, in chamber 31 will thus be subjected to the pressure of the pressurized fluid 34 on its exterior surface and to the equal pressure exerted on the assemblies interior surface by the fluid 35 within the bellows. These two pressures operating on the two sides of the bellows assemblies 45, or 20, are equal because the fluid in chamber 38, which is at the same pressure as the fluid in chamber 31 of the housing 10 must compress the bellows 40 in the chamber 38 until the fluid 35 within the bellows 40 is at the same pressure as the fluid in the chamber 38. Since the fluid 35 within the bellows is preferably a liquid in a static condition the pressure in chamber 30 must be the same as the pressure in the bellows 40. It will be apparent from the foregoing that the pressure differential across the bellows 45 or 20 and the bellows 40 are independent of the absolute pressure of the pressurized fluid 34 and that except for transients which may develope in the system, the pressure differential across the bellows 45 and 40, will be no greater with actuators operating with the working substance compressed to 1000 p.s.i. than it is with actuators using the working substance at 10 p.s.i.

The difference in the performance of the actuator shown in FIGURES 2 and 2A, as compared with the embodiment shown in FIGURE 1 will become clear if it is assumed that the passageways between the bellows 45 and 50, or 20 and 21, in FIGURE 2A, become blocked so that the fluid 35 is confined to chamber 30. If the exterior force $F_e$ resisting the movement of the piston has been reduced to zero, the pressurized fluid 34 entering the chamber 31 will compress the bellows 45 until it is nested, without creating an appreciable pressure differential across the bellows in the assembly or across the bellows 40. This result will be apparent since any decrease in the volume of chamber 30, brought about by compressing the bellows 45, will cause the liquid 35 within the bellows 45 to flow into and expand the bellows 40 against the pressure in chamber 38. The pressure in chamber 38 is the same as the pressure in chamber 31 of the housing 10. It will thus be seen that the piston 14 can execute one full cycle without creating high pressure differentials across the flexible fluid seal under conditions where the leakage of fluid from the chamber 30 to the chamber 30′ is negligible.

The quantity of fluid which can pass from the chamber 30 to the chamber 30′, before the bellows 45 nests is determined by the volume displacement of the bellows 45. If necessary, bellows 45 can be made large enough to supply liquid for lubricating purposes for several seconds. Lubrication may be necessary where the actuator is operated under conditions of high temperature. The lubrication is required between the piston 14 and the piston rings 19. Under such conditions the liquid 35 should be selected for its properties of wetting the surface of the rings 19 and the piston 14. When fluid 35 is oil and the ambient temperatures are not great enough to destroy the lubricating properties of the fluid, the spaces between piston 14, wall 17, and rings 19, may be made so close that the leakage of oil between the bearing surfaces is negligible.

When the piston 14 is free to move under the pressure exerted by the actuating fluids and completes its stroke in four seconds, it is apparent that, except for the necessity of having plenty of liquid for lubricating purposes, the bellows 40 need have a volume not much greater than the chamber 30. Assuming that the volume of bellows 40 is large and that the bellows assembly 45 has nested and is thereby protected from damage by high pressure differentials, bellows 40 will continue to force fluid from the chamber 30 to the chamber 30′ for some time before it nests. After it nests, no more fluid can be forced from the chamber 30 to chamber 30′. With bellows 45 and bellows 40 nested, the working substance 34 can be maintained at the operating pressure in housing chamber 31 without damaging the three bellows.

The fluid which passes from chamber 30 and the bellows 40 and enters chamber 31 will follow two paths. One portion of the fluid will remain within chamber 31 and fill the void created by the effect of piston 14 stretching the bellows assembly 50. The remainder of the fluid will enter the bellows 47 through the conduit 49. The pressure in the chamber 30′, conduit 49 and bellows 47 is equal to the pressure $P_x$ in chamber 46, and in general will be maintained at the ambient pressure $P_0$ by allowing vent 48 to remain open.

The pressure in chamber 31, however, can be made greater than $P_0$ when it is necessary to force the fluid 35 in the chamber 30 into chamber 30′, through the loose fitting ring 19 around the piston 14.

The pressures in chamber 31 and the bellows 47 can never become greater than $P_x$ because the bellows 47 is selected to have a volume greater than the volume of the liquid 35 which is forced from the chamber 30 into the chamber 31, when the actuator is operating at 1500° F.

The piston 14 is returned to the position from which it started by evacuating the chamber 31 through the conduit 51. As the piston 14 returns to its initial position, the bellows assembly 45 in FIGURE 2, or the bellows assembly 20 in FIGURE 2A, is stretched and a vacuum is produced in the inner chamber 30, the line 43, the bore 44, and the bellows 40, since there is not enough liquid to fill all of these chambers. The pressure $P_x$ being greater than the pressure in the chambers 31 and 38, the bellows 47 will force fluid into the chamber 30 by way of the conduit 49 and the spaces between the rings 19 and the piston 14 until the assembly consisting of the chamber 30, the line 43, the bellows 40 and the bore 44 are filled with liquid 35. The actuator is then ready to repeat the power cycle.

Figures 3, 3A:
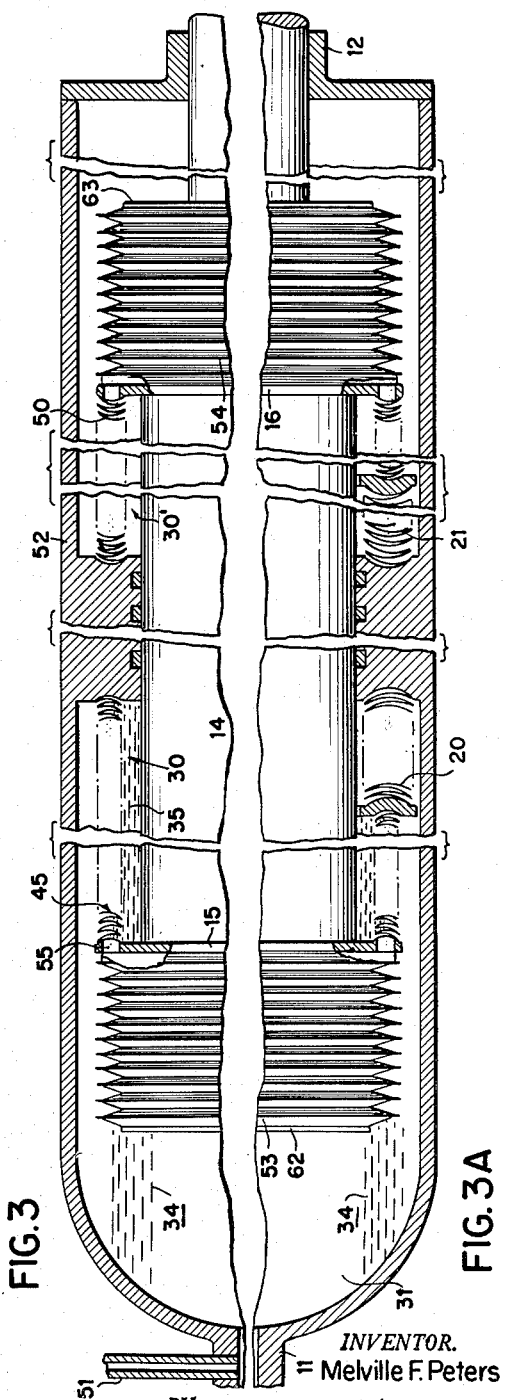
FIGURE 3 is a view in longitudinal section showing still another actuator in accordance with the present invention.
FIGURE 3A is a view similar to FIGURE 3 showing the use of two diameter bellows.

In FIGURES 3 and 3A there are shown actuator assemblies which are entirely contained within a cylindrical shell 52. In these embodiments, the expansion chambers of FIGURES 3 and 3A take the form of bellows 53, 54 which are welded to the end plates 15, 16 at each end of the piston 14. The fluid in bellows 53, 54 can flow into bellows 45, 50 through a plurality of bores 55, which are cut in the end plates 15, 16. Bellows 53, 54 are sealed at their outer ends by plates 62, 63. In all other respects the actuators shown in FIGURES 3 and 3A, operate in the same manner as that hereinabove set forth in connection with FIGURES 2 and 2A, to equalize the pressures and prevent bellows destruction.

In FIGURES 4 and 4A, there is shown a further embodiment of the present invention, in which the piston 14 is provided with longitudinal bores 65. The bores 65 run from the chamber 30 within the bellows assembly 45, or the two diameter bellows assembly 20 shown in FIGURE 4A, to the surface of the piston 14, which underlies the loose fitting rings 19. In this manner a thin film of liquid 35 may be discharged between the rings 19 and the piston 14 to lubricate the piston at that juncture. From Bernoulli's principle it is known that if the piston 14 bears heavily enough against the rings 19 to stop the flow of liquid out of one or more of the outlet holes 66, the pressure developed within these holes acting between the piston 14 and the rings 19 will be great enough to relieve some of the forces existing between the mating surfaces of the piston and the rings and therefore reduce the forces that cause galling. In all other respects, the operation of the actuator illustrated in FIGURES 4 and 4A is the same as that shown in connection with FIGURES 1 and 2.

Where it is desired to control the opening of a door or vent, or to produce an oscillating or reciprocating motion by means of actuators, it is necessary to combine two assemblies similar to those shown in connection with FIGURES 1, 2 and 3, in the manner illustrated in FIGURE 5.

In the embodiment of FIGURE 5, the connecting rods 13 and 13a are joined together. Although both of the actuators in the assembly shown in FIGURE 5 are identical, for convenience in describing the right hand section of the structure, the subscript $a$ will be given to the reference numeral applied to the actuator shown at the right hand of the embodiment. Since the actuator is to be operated continuously, and may be held in one position for a substantial length of time, it is necessary to have some way of removing fluid which leaks between the rings 19 and the piston 14. While fluid may be removed in many ways a convenient device is a pump such as is indicated at 56 and 56a in FIGURE 5. The pump 56 is connected to the interior of the bellows on each side of the wall 17 of the housing 10.

Power is supplied from the actuator shown in FIG-

URE 5 by securing an arm 57 to the rods 13. The actuator is forced to move from left to right by making the fluid pressure in the chamber 31 greater than the fluid pressure in the chamber 31a. The actuator may be forced to move from right to left by making the fluid pressure in the chamber 31a greater than the fluid pressure in 31. Valve means indicated at 58 and 58a in FIGURE 5, are employed to control the flow of fluid 34 from one side of the actuator assembly to the other. The fluid under pressure is introduced into the actuator assembly through conduit 59 and may be led to either side of the actuator by the proper opening and closing of valve 58 and 58a. A fluid bearing line 60, 60a, connects valve 58, 58a, with the chambers 31, 31a.

Having thus fully described the invention, what is claimed as new and desired to be secured by Letters Patent of the United States is:

1. A high pressure fluid operated actuator comprising, a hollow housing, a centrally bored wall in said housing, a piston having an input and an output side slidably received within the said bore, a first bellows assembly around the piston on the input side thereof, said bellows assembly being connected at one end to the piston and at its opposite end to the housing wall, whereby a fluid receiving chamber is formed around the input side of the piston, a second bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

2. A high pressure fluid operated actuator comprising, a hollow housing, a centrally bored wall in said housing, a piston having an input and an output side slidably received within the said bore, a plurality of rings carried by the wall within the bore and loosely fitted about the piston, a first bellows assembly around the piston on the input side thereof, said bellows assembly being connected at one end to the piston and at its opposite end to the housing wall, whereby a fluid receiving chamber is formed around the input side of the piston, a second bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

3. A high pressure fluid operated actuator comprising, a hollow housing, a centrally bored wall in said housing, a piston having an input and an output side slidably received within the said bore, a first two diameter bellows assembly around the piston on the input side thereof, said bellows assembly being connected at one end to the piston and at its opposite end to the housing wall, whereby a fluid receiving chamber is formed around the input side of the piston, a second two diameter bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

4. A high pressure fluid operated actuator comprising, a hollow housing, a centrally bored wall in said housing, a piston having an input and an output side slidably received within the said bore, a plurality of rings carried by the wall within the bore and loosely fitted about the piston, a first nesting bellows assembly around the piston on the input side thereof, said bellows assembly being connected as one end to the piston and at its opposite end to the housing wall, whereby a fluid receiving chamber is formed around the input side of the piston, a second nesting bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

5. A high pressure fluid operated actuator comprising, a hollow housing, a centrally bored wall in said housing, a piston having an input and an output side slidably received within the said bore, a plurality of rings carried by the wall within the bore and loosely fitted about the piston, a first two diameter nesting bellows assembly around the piston on the input side thereof, said bellows assembly being connected at one end to the piston and at its opposite end to the housing wall, whereby a fluid receiving chamber is formed around the input side of the piston, a second two diameter nesting bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

6. A high pressure fluid operated actuator according to claim 5 in which a spring is disposed between the housing and the piston on the output side thereof to return the actuator to its position of rest.

7. A high pressure fluid operated actuator according to claim 5 in which the second bellows assembly has a volume somewhat larger than the first bellows assembly.

8. A high pressure fluid operated actuator comprising, a hollow housing, a centrally bored wall in said housing, a piston having an input and an output side slidably received within the said bore, a first bellows assembly around the piston on the input side thereof, said bellows assembly being connected at one end to the piston and at its opposite end to the housing wall, whereby a fluid receiving chamber is formed around the input side of the piston, a first fluid expansion unit connected to the first bellows assembly chamber, a second bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, a second fluid expansion unit connected to the second bellows assembly, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

9. A high pressure fluid operated actuator according to claim 8 in which the first expansion unit consists of a fluid tight chamber, a fluid bearing line connecting said chamber and the interior of the housing, a first bellows member in said chamber, said bellows being sealed at one end and connected at its other end to the fluid receiving chamber of the first bellows assembly and the second expansion unit consists of a fluid tight chamber, a second bellows member in said chamber, said second belows being sealed at one end and connected at its other end to the fluid receiving chamber of the second bellows assembly.

10. A high pressure fluid operated actuator according to claim 8 in which the first expansion unit consists of a fluid tight chamber, a fluid bearing line connecting said chamber and the interior of the housing, a first nesting type bellows member in said chamber, said bellows being sealed at one end and connected at its other end to the fluid receiving chamber of the first bellows assembly and the second expansion unit consists of a fluid tight chamber, an outlet in said chamber to the atmosphere, a second nesting type bellows member in said chamber, said second bellows being sealed at one end and connected at its other end to the fluid receiving chamber of the second bellows assembly.

11. A high pressure fluid operated actuator comprising, a hollow housing, a centrally bored wall in said housing, a piston having an input and an output side slidably received within the said bore, a plurality of rings carried by the wall within the bore and loosely fitted about the piston, a first two diameter nesting bellows assembly around the piston on the input side thereof, said bellows assembly being connected at one end to the piston and at its opposite end to the housing wall, whereby a fluid receiving chamber is formed around the input side of the piston, a first fluid expansion unit connected to the first bellows assembly chamber, a second two diameter nesting bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, a second fluid expansion unit connected to the second bellows assembly, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

12. A high pressure fluid operated actuator according to claim 8 in which the first and second fluid expansion units consist of bellows members carried within the housing on each end of the piston, said bellows members being sealed on one end and in fluid communication with the fluid receiving chamber of the first and second bellows assemblies.

13. A high pressure fluid operated actuator comprising, a hollow housing, a centrally bored wall in said housing, a piston having an input and an output side slidably received within the said bore, a plurality of rings carried by the wall within the bore and loosely fitted about the piston, a first bellows assembly around the piston on the input side thereof, said bellows assembly being connected at one end to the piston and at its opposite end to the housing wall, whereby a fluid receiving chamber is formed around the input side of the piston, a plurality of elongated bores in the piston, said bores leading from the fluid receiving chamber within the first bellows assembly to the surface of the piston adjacent the rings, a second bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

14. A high pressure fluid operated actuator comprising, a hollow housing, a centrally bored wall in said housing, a piston having an input and an output side slidably received within the said bore, a plurality of rings carried by the wall within the bore and loosely fitted around the piston, a first two diameter nesting bellows assembly around the piston on the input side thereof, said bellows assembly being connected at one end to the piston and at its opposite end to the housing wall, whereby a fluid receiving chamber is formed around the input side of the piston, a plurality of elongated bores in the piston, said bores leading from the fluid receiving chamber within the first bellows assembly to the surface of the piston adjacent the rings, a second two diameter nesting bellows assembly around the output side of the piston, said second bellows assembly being connected at one end to the piston and at its opposite end to the housing wall, whereby a fluid receiving chamber is formed around the output side of the piston, said chambers being interconnected by the wall bore therebetween, an opening in the output end of the housing, a rod slidably received within the opening and connected at its inner end to the piston, a quantity of fluid within the bellows chamber around the input side of the piston, and an opening in the housing on the input side thereof to receive fluid under pressure to drive the piston and operate the actuator.

15. A high pressure fluid operated actuator comprising, opposed elongated hollow housings, a centrally bored wall in said housings, a piston having an input and an output side slidably received within each of said bores, a rod interconnecting the pistons, a first bellows assembly around each of the pistons, on the input side thereof, said bellows assemblies being connected at one end to the piston and at their opposite ends to the housing wall whereby a fluid receiving chamber is formed around the input side of each piston, a second bellows assembly around the output side of each piston, each of said second bellows assemblies being connected at one end to the piston and at its opposite end to the housing wall, whereby a fluid receiving chamber is formed around the output side of each piston, said input and output chambers being interconnected by the wall bore therebetween, an opening in the input end of each housing a fluid line connected to each input opening and means to control the flow of fluid under pressure through each of said lines to operate the actuator.

16. A high pressure fluid operated actuator according to claim 15 in which each of the first bellows assemblies is provided with a fluid expansion unit.

17. A high pressure fluid operated actuator according to claim 15 in which the chambers are interconnected by bores within the housing walls and a pump connected to said bores.

18. A high pressure fluid operated actuator according to claim 15 in which the control means consists of valves in the said lines and the output sides of the pistons are opposed to one another and axially disposed with respect to the rod.

(References on following page)

References Cited in the file of this patent

UNITED STATES PATENTS

| | | |
|---|---|---|
| 2,111,855 | Groh | Mar. 22, 1938 |
| 2,544,785 | Gardner | Mar. 13, 1951 |
| 2,718,896 | Jones | Sept. 27, 1955 |
| 2,879,781 | Gimson | Mar. 31, 1959 |
| 2,932,203 | Peters | Apr. 12, 1960 |
| 2,942,838 | Peters | June 28, 1960 |

FOREIGN PATENTS

| | | |
|---|---|---|
| 764,965 | France | Mar. 31, 1934 |